C. B. TODD.

Assignor to the CAMPBELL BURNER COMPANY, (Limited).

GAS BURNER.

No. 10,985. Reissued Feb. 12, 1889.

Witnesses:-

W. B. Corwin

H. R. Gill

Inventor:-

Cornelius B. Todd by N. Bakewell & Sons his attorneys

N. PETERS, Photo-Lithographer, Washington, D. C.

UNITED STATES PATENT OFFICE.

CORNELIUS B. TODD, OF PITTSBURG, PENNSYLVANIA, ASSIGNOR TO THE CAMPBELL BURNER COMPANY, (LIMITED,) OF SAME PLACE.

GAS-BURNER.

SPECIFICATION forming part of Reissued Letters Patent No. 10,985, dated February 12, 1889.

Original No. 370,107, dated September 20, 1887. Application for reissue filed June 19, 1888. Serial No. 277,595.

*To all whom it may concern:*

Be it known that I, CORNELIUS B. TODD, of Pittsburg, in the county of Allegheny and State of Pennsylvania, have invented a new and useful Improvement in Gas-Burners; and I do hereby declare the following to be a full, clear, and exact description thereof.

My invention relates to an improvement in gas-burners for illuminating purposes. The purpose for which I have especially devised it is for burning what is known as "natural gas," which, being comparatively deficient in carbon, burns with the characteristic blue flame of hydrocarbon gases without emitting much light. I have found, however, that when natural gas is burned in connection with heated air its illuminating properties are better, while where the gas is heated deposits of carbon take place, which in a short time are sufficient to clog the burner. For this reason the burners now in general use in connection with gas in which both the air and gas are heated are not adapted for the use of natural gas.

It will be noticed that in my improved burner the parts are arranged for the purpose of heating the air only, the flames being directed or deflected toward the air-heating disks, while no provision is made for heating the gas, but, on the other hand, the cool air surrounding the gas-pipe acts as a cooling agent to the same.

Figure 1:
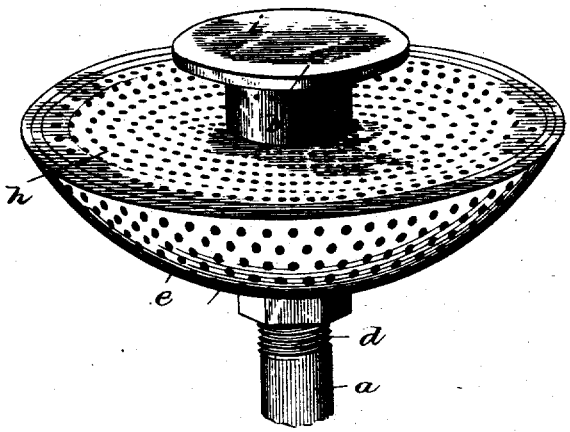
Figure 2:
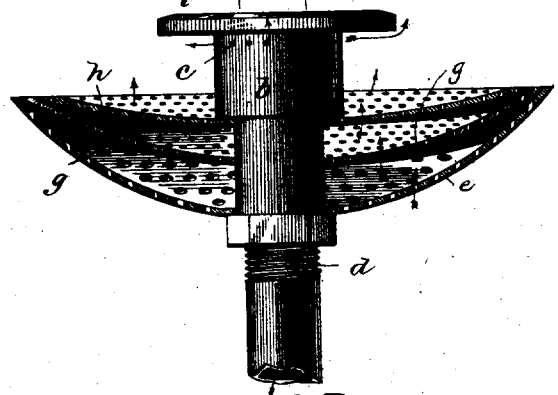
Figure 3:
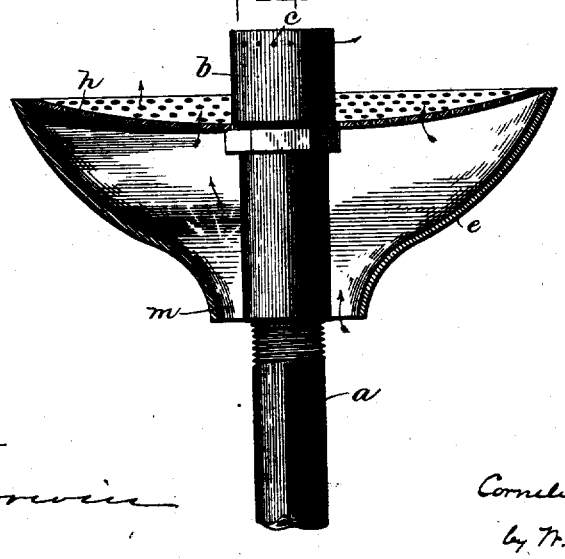

In the accompanying drawings, forming part of this specification, Figure 1 is a perspective view of the burner. Fig. 2 is a vertical diametrical section of the same. Fig. 3 is a vertical diametrical section of a modification.

Like letters of reference indicate like parts wherever they occur.

The burner shown is designed for mill-lights, or burners used without shade or chimney for the illumination of factories and other open places exposed to drafts of air. The gas is fed through a supply-pipe, *a*, into the cap *b*, which forms the jet or burner proper, and is provided with an annular series of lateral perforations, *c*, preferably situate in one horizontal plane. The cap *b* is closed at the top, and is attached to the feed-pipe *a* by being screw-threaded, as shown at *d* in Fig. 2. Mounted upon and concentric with the pipe *a*, below the perforations of the burner-cap, is a concave cup-shaped disk, *e*, which forms the base of what I will herein denominate a "heating-chamber," while placed within this base, and likewise concentric with the pipe *a*, are one or more superposed concave disks, *g* and *h*. The radii of curvature of these parts are successively greater than the part *e*, so that when in position they are somewhat separate from each other, thereby forming one or more superposed chambers, *e g* and *g h*, or one chamber, *e h*, divided into two parts by a middle partition.

Each of the concave disks *e*, *g*, and *h* may be perforated with many holes, so as to permit free passage of air through the chambers and out of the perforations of the upper plate, *h*, which are situate just beneath the gas-holes of the burner-cap *b*. The direction of the latter holes is horizontal, as has been noticed, so that the flame as it issues thence is caused to impinge upon the rim of the lower disk or cup, *e*, and the outer parts of the surface disk *h*, thereby raising these parts to a considerable heat. The cap *b* may be surmounted by a horizontal plate or deflector, *i*, which extends circumferentially considerably above the periphery of the cap. The effect of this part is to reflect heat from the burning gas down upon the surface of the topmost disk and through its perforations within the chamber *e g* and *g h*. As a matter of construction, I prefer to make the disk of considerable thickness of metal, since the heat is thereby caused to spread evenly throughout these parts by conduction.

In Fig. 3 the outer cup, *e*, is formed without perforations, an annular passage, *m*, between the base of the cup *e* and the pipe *a* permitting the passage of air to the air-chamber *e h*. The disk *g* may also be omitted, and also the deflector *i*.

The operation of my improvement when thus constructed will be readily understood. The combustion of gas as it issues from the lateral jets *c* creates a vacuum above the disk *h* and induces the air for combining with the gas through the burner-chamber *e h* and through the perforations of the several disks composing the same or the passage *m*. The disks are, however, heated by the burning gas-flame issuing from the lateral jets, and by contact and radiation give up their heat to the passing air, which in turn becomes so hot as to perceptibly increase the illumination of the gas in a very short time from the first ignition of the same.

The advantages of my improved burner are very great. The flame produced is of larger area and possesses much greater illuminating properties than that produced by an ordinary burner. This is caused by the lateral jets causing the gas to pass horizontally into the ascending currents of heated air which arise from the air-chamber, and where the burner, as herein described, is used in connection with natural gas a brilliant white flame is produced, which is due to the combination of the air-chamber and the lateral gas-jets, for upon the removal of the air-chamber the flame becomes yellow and loses its brilliancy, and should vertical gas-jets be employed the flame would practically be non-illuminating.

I do not desire to claim, broadly, in a gas-burner a heating-chamber having perforated disks or sides.

I am aware of English Letters Patent No. 2,755 of 1882, and German Letters Patent No. 15,467 of 1881, and do not desire to claim the devices therein shown.

Having thus described my invention, what I claim, and desire to secure by Letters Patent, is—

1. In an illuminating-gas burner, the combination of a burner comprising a pipe for supplying gas without air, and having lateral jet-openings, and a reticulated or perforated plate situated below the jet-openings of the burner, the mesh or perforations being sufficiently fine to break the ascending currents of air and heat the same, substantially as and for the purposes specified.

2. In a gas-burner, the combination of the burner *b*, having lateral jet-openings *c*, and an air-chamber having a perforated top situate below the jet-openings of the burner, so that the air-chamber shall be adjacent to the burner and arranged to heat the air, substantially as and for the purposes described.

3. In a gas-burner, the combination of the burner *b*, having a central deflector, *i*, and jet-openings *c*, situate below the deflector, and cup-shaped perforated disks *e* and *h*, arranged below the jet-openings of the burner and the deflector, so as to form an air-chamber adjacent to the burner and arranged to heat the air, substantially as and for the purposes described.

4. In a gas-burner, the combination of the burner *b*, having a central deflector, *i*, and jet-openings *c*, situate below the deflector, separated perforated disks *e* and *h*, and interposed disk *g*, arranged below the jet-openings of the burner and the deflector, so as to form an air-chamber adjacent to the burner and arranged to heat the air, substantially as and for the purposes described.

In testimony whereof I have hereunto set my hand this 9th day of March, A. D. 1888.

CORNELIUS B. TODD.

Witnesses:

W. B. CORWIN,

J. K. SMITH.